(12) United States Patent
Kokobun et al.

(10) Patent No.: US 8,717,577 B1
(45) Date of Patent: May 6, 2014

(54) COMPENSATING APERTURE FOR UTILIZING SHEAROGRAPHY FROM A MOVING PLATFORM

(75) Inventors: Daniel Kokobun, Waipahu, HI (US); Christopher E Saxer, Chapel Hill, NC (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 234 days.

(21) Appl. No.: 13/357,574

(22) Filed: Jan. 24, 2012

Related U.S. Application Data

(60) Provisional application No. 61/435,633, filed on Jan. 24, 2011.

(51) Int. Cl.
*G01B 9/02* (2006.01)

(52) U.S. Cl.
USPC .......................................... 356/520

(58) Field of Classification Search
CPC ........... G01B 9/02076; G01B 9/02094; G01B 9/02095; G01B 9/02096; G01B 9/02097; G01B 11/161; G01S 3/7862
USPC .......................... 356/2, 3, 35.5, 502, 520, 621
See application file for complete search history.

(56) References Cited

U.S. PATENT DOCUMENTS

| | | | | |
|---|---|---|---|---|
| 5,004,345 A | * | 4/1991 | Hung | 356/520 |
| 6,219,143 B1 | * | 4/2001 | Lindsay et al. | 356/458 |
| 7,116,427 B2 | * | 10/2006 | Baney et al. | 356/498 |
| 7,933,003 B2 | * | 4/2011 | Meldahl et al. | 356/28.5 |
| 8,411,279 B2 | * | 4/2013 | Scott | 356/498 |

OTHER PUBLICATIONS van Brug, Hedser. "Real-time speckle shearography system for defect detection in aircraft materials". Proc. SPIE 3586, Nondestructive Evaluation of Aging Aircraft, Airports, and Aerospace Hardware III, 239, Jan. 28, 1999, pp. 239-247.*

* cited by examiner

*Primary Examiner* — Michael A Lyons
(74) *Attorney, Agent, or Firm* — Joseph E. Funk; Daniel J. Long

(57) ABSTRACT

The invention allows a shearography system to successfully sense ground/surface vibrations while moving at aircraft speeds and altitudes. This is done by effectively making stationary the apparent location of a coherent laser beam illuminating an area on the ground/surface, and also effectively making stationary the apparent location of the aperture of an optical receiver which acquires pairs of sequential images captured and used for shearography. A different laser is used for capturing each of the two images, and the distance between the two lasers is adjusted based on a number of operational parameters. The adjustment of the distance causes the apparent locations of the transmitter and a receiver sub-aperture to remain the same and permits the moving shearography to work.

18 Claims, 6 Drawing Sheets

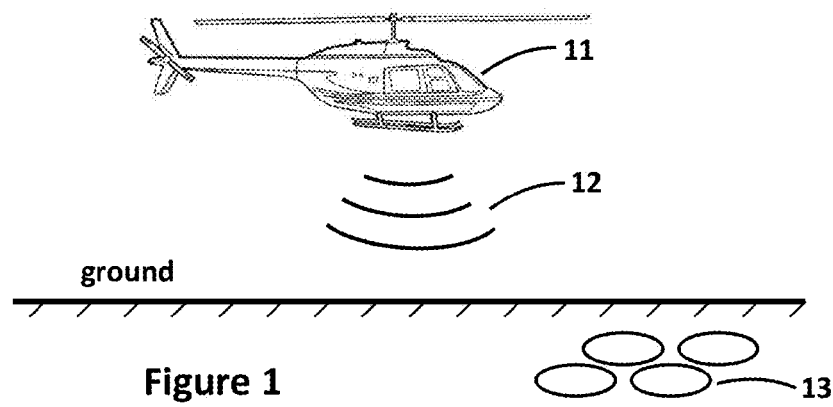
Figure 1
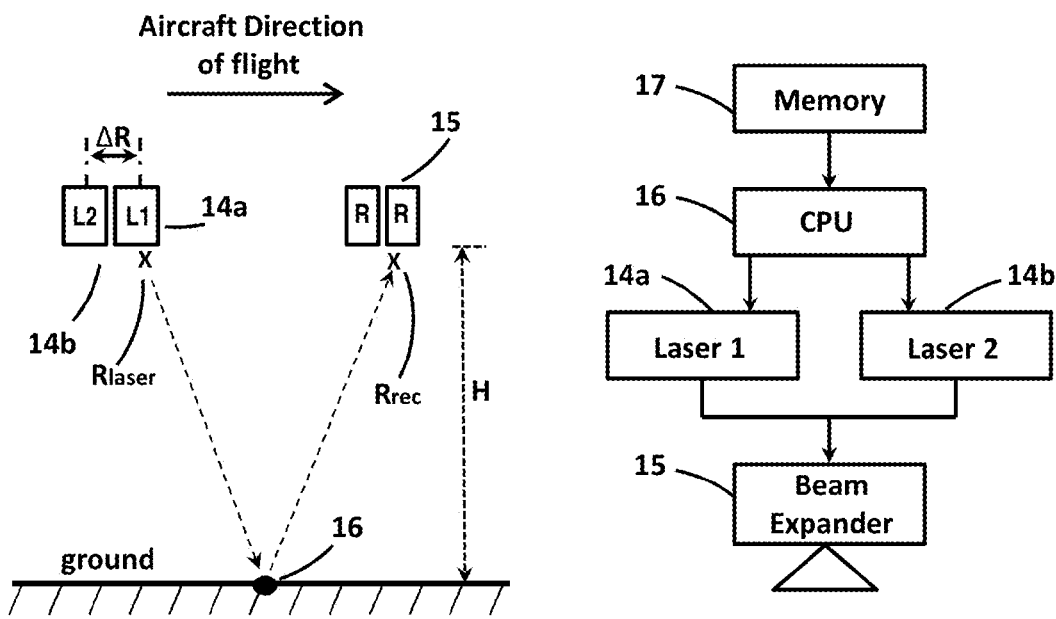
Figure 2
Figure 3

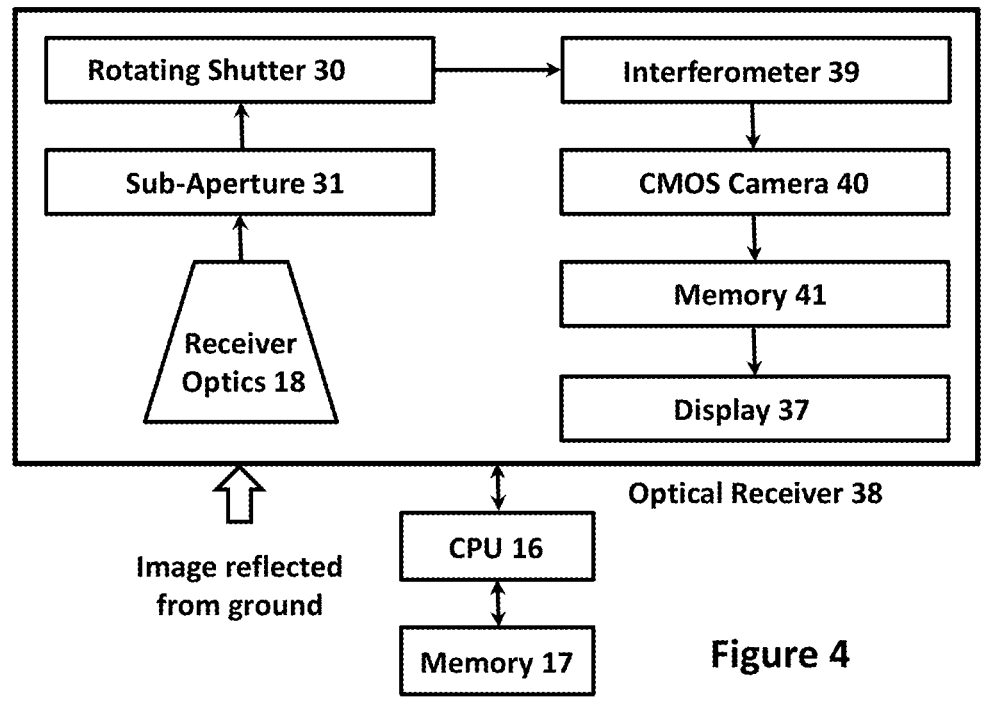
Figure 4
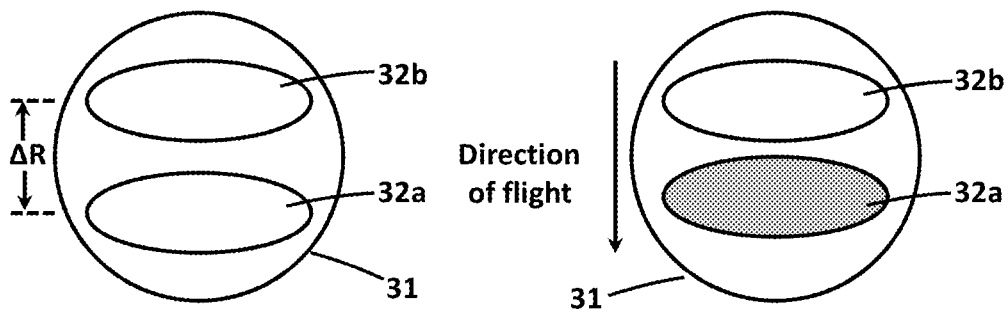
Figure 5      Figure 7
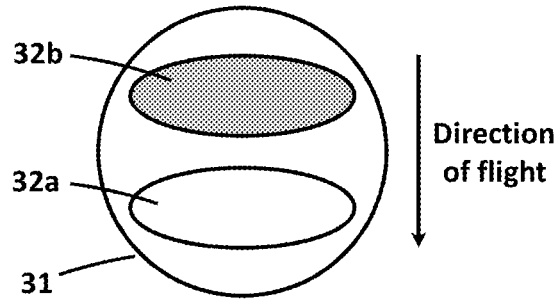
Figure 6

COMPENSATING APERTURE FOR UTILIZING SHEAROGRAPHY FROM A MOVING PLATFORM

RELATED APPLICATIONS

This application claims the benefit of U.S. Provisional Application 61/435,633 filed Jan. 24, 2011, which is incorporated herein in its entirety by reference.

GOVERNMENT RIGHTS

The present invention was made with United States Government support under Contract No. N00014-07-C-0292 awarded by the United States Government, Department of the Navy. The United States Government has certain rights in this invention.

FIELD OF THE INVENTION

The invention relates generally to remote detection and imaging systems. More specifically the invention relates systems and methods for automatically detecting electromagnetic energy reflected or scattered from an object, and determining therefrom information about the object.

BACKGROUND OF THE INVENTION

In shearography, a surface being observed is illuminated by an expanding laser beam, and two time sequential images are captured of the surface of a part with an image-shearing camera. The first image is taken of the surface, and the second image is taken of the same surface a short time thereafter after some deformation of the surface. The two images taken are processed together to produce a third image showing a fringe pattern that depicts the gradient of the displacement of the surface due to some loading of the surface between the first and second images.

More particularly, shearography is an optical measuring technique using coherent light, for the interferometric observation of the surfaces of parts typically under non-destructive thermal or mechanical loading to distinguish between structural information and anomalies of the surfaces of parts due to loading such as thermal or mechanical loading. The two images are each laterally displaced images taken of the surface of the part being observed and the two images are coherently superposed. The lateral displacement is called the shear of the images. The superposition of the two images is called a shearogram, which is an interferogram of an object wave with the sheared surface wave as a reference wave.

The absolute difference of two shearograms recorded at different physical loading conditions of the sample part is an interference fringe pattern which is directly correlated to the difference in the deformation state of the sample part between taking the two images thereof. In contrast to holographic interferometry the fringe pattern indicates the slope of deformation rather than the deformation itself. Defects inside the sample part will affect the local surface deformation induced by the loading and result in a disturbance of the loading fringes that is detected.

The resultant difference images always exhibit a very noisy structure. This is due to what are called speckles. Speckles are statistical interference patterns which occur after reflection of a coherent wave off a rough surface giving the image a grainy structure. Regarding shearography the speckles are the carrier of information, coding the wave field and surface state information respectively and giving rise to interference fringe patterns. However the grainy nature of the speckles is conserved and significantly decreases contrast and signal to noise ratio of the difference images.

The difference images typically exhibit strong noise and low contrast that require further image processing. This further image processing can be either image improvement or image evaluation. The goal is to remove speckle noise and to increase fringe contrast in order to improve the visibility of the fringes.

One shortcoming of existing shearography techniques is that they do not accommodate collecting shearography data from moving platforms such as aircraft, surface craft, or handheld devices. Thus, there is a need in the art for a way to collect shearography data from a moving platform.

SUMMARY OF THE INVENTION

The previously described need in the prior art for a way to collect shearography data for a subject target from a moving platform, such as an aircraft, surface craft, hand held device or moving vehicle, is met by the present invention.

It will be appreciated by those knowledgeable in the art that movement of a prior art shearography system with respect to a target changes the laser speckle reflected from the target so that the shearography data is useless. Therefore, changes in laser speckle due to motion of a shearography laser source and optical receiver with respect to a target of interest must be eliminated in order to isolate the reflected signal of interest being received from the target. As previously mentioned, speckles are statistical interference patterns which occur after reflection of a coherent wave off a surface giving the image a grainy structure.

The optical receiver captures and stores both the first and second reflected laser beam images. Each laser image is divided by means of an interferometer into two copies that are laterally displaced from one another on the same image plane. The lateral displacement of the image copies accounts for the term "shearing". The sheared image copies are combined to form an interference pattern, or specklegram. Because laser light is coherent, the interference pattern appears as a random interference pattern or set of "speckles" that is commonly called a "speckle pattern". Comparison of specklegrams generated by the first and second laser beam images reveals any microscopic changes in the surface shape that occurred between the first and second images. The pairs of specklegrams are processed together so as to render a single image, or shearogram, that shows the surface changes as set of visible shearogram fringes.

In operation the shearography system of the present invention is mounted on a moving platform such as, but not limited to, an aircraft. Normally, the moving platform would cause loss of the speckle correlation between the pairs of specklegrams resulting in partial or complete loss of contrast of the shearogram fringes. There are two laser transmitters and an optical receiver. In operation while the moving platform is moving the laser transmitters and optical receiver are operated in a manner that they appear to be stationary. This is done in the following novel manner. To capture the pair of images (specklegrams) required for shearography a first laser transmitter transmits a first laser pulse toward the ground while positioned at an angle θ with respect to the ground. The resulting first ground image is captured by an optical receiver. A very short time thereafter (Δt) a second laser transmitter transmits a second laser pulse toward the ground at the same angle θ. This occurs, because the position of the second laser transmitter has been initially adjusted according to the speed of the moving platform and during the time Δt second laser transmitter has moved a distance ΔR by the motion of the aircraft and is then at the same position that the first laser transmitter originally was.

At the time that first laser transmitter is at angle θ and transmits the first laser pulse, the optical receiver is at an angle θ with respect to the ground. At the time Δt the optical receiver has moved the distance same ΔR by the motion of the aircraft. However, when the second laser transmitter transmits the second laser pulse a mechanical shutter and sub-aperture within the optical receiver cooperate to the effectively capture the second ground image at the same angle θ. Thus, two images are captured at the same angles θ that is required to preserve the contrast of the shearogram fringes.

The shearography system on the moving platform has two spaced lasers thereon that generate pairs of time spaced pulses spaced a few milliseconds apart. Two lasers are utilized to have very short time interval between each the two laser pulses of a pair of pulses. Currently, a single laser can't generate laser pulses this fast with sufficient power and coherence-length for airborne applications, so a common-seeded pair of laser is employed. The pulses are expanding laser pulses, spread by a beam expander. Each of the expanding laser pulses is directed perpendicular to the ground and illuminates an area on the ground that is generally about two meters across. The wavelength of both laser pulses is in the order of 530 nanometers and their wavelengths match.

The moving platform on which the shearography equipment is mounted is generally moving parallel to and relatively close to the ground, and the ground is being deformed a small amount by a relatively high power, low frequency sound wave that is directed from the moving platform toward the ground and vibrates the ground. The deformation of the ground is sufficient for the proper operation of the shearography equipment.

The expanding pulsed laser beam from a first of the two laser transmitters impacts the ground below the vehicle, is reflected from the vibrating ground and the reflected signal is received by a shearography optical receiver that has a large input aperture in the order of 600 millimeters. This is repeated for the second of the two laser transmitters.

Each of the two received laser beams is passed through a shearing interferometer to form an interference pattern image, or specklegram. The two specklegrams are then combined to produce a third image, which shows their differences. With coherent laser light being used the combined image exhibits a fringe pattern that depicts the gradient of the displacement of the surface of the ground due the deformation of the ground due to the high power low frequency sound impinging on the ground during the shearography process.

To help compensate for the normally unwanted changes in laser speckle due to motion of a shearography laser source and receiver with respect to a target of interest, and to compensate unwanted vibrations, the optical shearography receiver has a wide field of view, and the spacing between the laser pulses from the two lasers produce a pair of images for the shearography process that are time spaced only a few milliseconds apart. Accordingly, the reflected image received from the ground for each of the two laser pulses (first image and second image) overlap by about 90% due to the wide field of view of the receiver optics. A mechanical rotating shutter and a fixed sub-aperture having two holes there through are utilized. As the mechanical rotating aperture is rotated it first permits only a portion of the large first image (created by a pulse from the first laser) to pass through a first of the two holes through the fixed sub-aperture to thereby create a first smaller image on a CMOS camera that is captured and stored. As the mechanical rotating aperture rotates further it permits only a portion of the large second image (created by a pulse from the second laser) to pass through the second of the two holes through the fixed sub-aperture to create a second smaller image on a CMOS camera that is captured and stored. Stated another way, the sub-aperture in conjunction with the mechanical rotating aperture cooperate to keep the entrance sub-aperture of the optical receiver approximately fixed in space between the first and second laser pulse. The two images created using each of the two holes through the sub-aperture for each of the pulses from first laser and second laser images appear to be created from the same point in space, despite the fact that the shearography equipment is moving. In this way, the majority of speckles are identical between the first and second pulses, and non-common speckles are rejected. Due to the very small time difference between the two images being taken and the very short distance that the shearography system has traveled in this small amount of time, there is little decorrelation between the speckle fields of the two images and what decorrelation there is compensated for by an image registration algorithm.

The position of slots through the mechanical shutter, the timing between laser pulses and the distance between the two holes through the sub-aperture are all interrelated and are carefully adjusted to assure that, in operation, the first and second images are taken from the same point in space despite the movement of the moving platform. Thus, an anomaly on the ground below the moving platform that appears in the first smaller image (reduced by passage through the first hole through the sub-aperture) will be in the same position in the second smaller image (reduced by passes through the second hole through the sub-aperture). The purpose for creating the two smaller images is to have the fewest non-common speckles and have the most common speckles. The two stored smaller images are processed in a computer using an image registration algorithm to further improve the images so that they appear to have been captured by a prior art stationary shearography system. The two modified images are then combined in the manner known in the prior shearography art to show a speckle pattern that shows disturbances that indicate the presence of anomalies on the ground.

DESCRIPTION OF THE DRAWINGS

The invention will be better understood upon reading the following Detailed Description in conjunction with the drawings in which:

FIG. 1 shows an aircraft moving above the ground while transmitting a high intensity sound signal toward the ground to implement moving shearography;

FIG. 2 is a simplified diagram of the moving shearography that is used to illustrate in the simplest manner the operation of the novel moving shearography system;

FIG. 3 is a simplified block diagram showing the laser transmitter portion of the moving shearography system;

FIG. 4 is a simplified block diagram of the optical receiver portion of the moving shearography system;

FIG. 5 show a novel sub-aperture element of the present invention;

FIG. 6 shows the sub-aperture element as a second of its two holes are blocked by a mechanical shutter to permit passage of a first image created by a pulse from a first laser only through the first of its two holes;

FIG. 7 shows the sub-aperture element as the first of its two holes are blocked by the mechanical shutter to permit passage of a second image created by a pulse from the second laser only through the second of its two holes;

DETAILED DESCRIPTION

Figure 8:
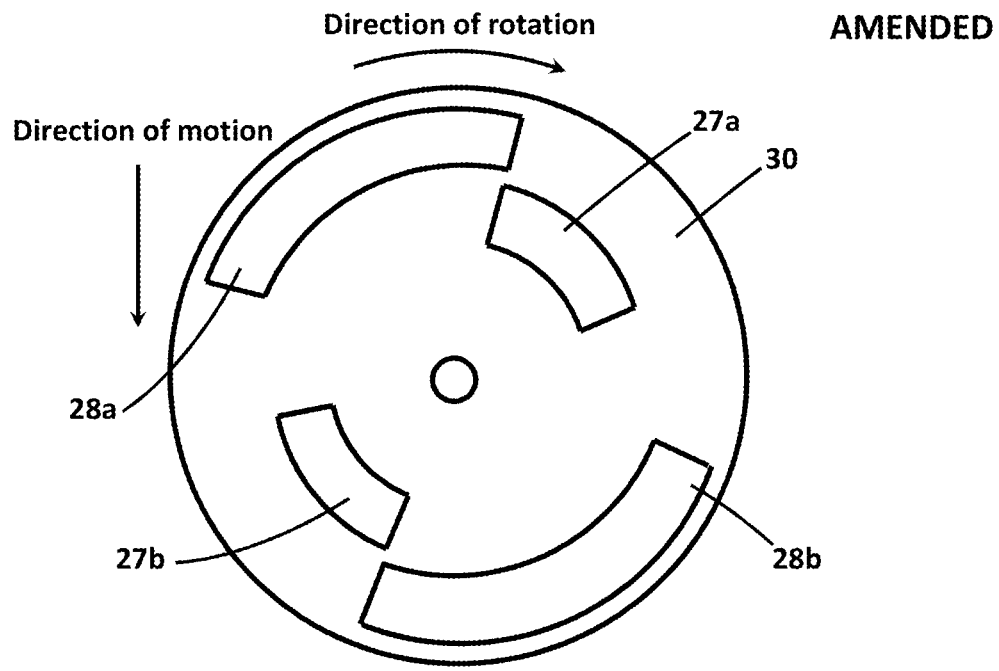
FIG. 8 shows the rotating mechanical shutter with two sets of slots there through for alternately opening and blocking the two holes through the sub-aperture to alternately capture the first image created by a pulse from the first laser and capture the second image created by a pulse from the second laser while implementing the capture of the two images from the same point in space.

FIG. 1 shows an aircraft 11 moving to the right above the ground while transmitting a high intensity sound signal 12 toward the ground. Sound signal 12 is utilized to cause sufficient vibration deformation of the ground required for moving shearography to operate. The frequency of the sound is selected to cause the greatest vibration. Buried in the ground are anomalies 13 that may be, for example, archaeological remains. Aircraft 11 preferably flies at an altitude between 100 feet and 500 feet at a speed of 40 mph. However, the altitude and speed may be varied, along with other operating variables, for specific applications. Sound signal 12 will typically be transmitted toward the ground at an intensity of 150 decibels, or at another intensity level so that at ground level the sound intensity is in the order of 120 decibels. The intensity level may be varied, depending on the makeup of the ground, to provide the vibration deformations of the ground required for the moving shearography to operate.

FIG. 2 is a simplified diagram of the moving shearography that is used to illustrate in the simplest manner the operation of the novel moving shearography system. In operation the shearography system of the present invention is mounted on a moving platform such as, but not limited to, an aircraft 11 (FIG. 1). Normally, a moving platform will cause a problem in performing shearography in the shearography art. There are two laser transmitters 14a and 14b and an optical receiver 15. In operation while the moving platform is moving the laser transmitters and optical receiver are operated in a manner that they appear to be stationary in space. This is done in the following novel manner. To capture a pair of images required for shearography a first laser transmitter 14a transmits a first laser pulse toward the ground while positioned at a location $R_{laser}=(X_{laser},Y_{laser},H_{laser})$ with respect to the ground. The resulting first ground image is captured by optical receiver 15. A very short time thereafter (Δt) a second laser transmitter 14b transmits a second laser pulse toward the ground from the same location $R_{laser}$. This occurs, because the position of the second laser transmitter 14b has been initially adjusted by −ΔR according to the speed of the moving platform 11 and the time Δt between laser pulses, and during the time Δt second laser transmitter 14b has moved a distance ΔR by the motion of the aircraft 11 and is then at the same position that the first laser transmitter 14a originally was when it transmitted its pulse toward the ground.

At the same time that first laser transmitter is at a position $R_{laser}$ and transmits the first laser pulse, the optical receiver is at position $R_{rec}=(X_{rec},Y_{rec},H_{rec})$ with respect to the ground. At the time Δt the optical receiver has also moved the distance same ΔR by the motion of the aircraft. However, when the second laser transmitter transmits its second laser pulse a mechanical shutter and sub-aperture within the optical receiver cooperate to the effectively capture the second ground image with the receiver sub-aperture at the same position $R_{rec}$.

FIG. 3 is a simple block diagram of the laser transmitter portion of the novel moving shearography system. A more detailed description of the laser transmitter is presented hereinafter with reference to FIG. 14. The shearography system utilizes two lasers 14a and 14b that alternately generate a laser pulse that are directed toward the ground. The two lasers each have a wavelength of 532 nanometers. Two lasers are utilized due to the very short time between two successive laser pulses required to create the interference patterns for the moving shearography and to permit the present invention to function properly. The time difference between the pulses from laser 14a and laser 14a is only a few milliseconds. The two laser beams are expanded by separate beam expanders 15a and 15b aimed parallel one another to illuminate a diameter of approximately 2 meters on the surface of the ground below aircraft 11. Beam expanders are well known in the art and examples may be seen in U.S. Pat. Nos. 4,205,902 and 6,157,756. Diffusers are not utilized as beam expanders. CPU 16, operating under control of a program stored in memory 17, controls when laser pulses are generated by lasers 14a and 14b. CPU 16 also receives a timing pulse input from LED 42 and light detector 43 (FIG. 15) indicating the position of a mechanical shutter 30 shown in and described with reference to FIG. 9 and in order to synchronize the position of shutter slots 27a,b and 28a,b with holes 32a and 32b through sub-aperture element 31 to capture the reflected images from the ground generated by the laser pulses from lasers 14a and 14b. More particularly, the synchronization input received by CPU 16 is generated by an LED 42 and light detector 43 as mentioned above. LED 42 is positioned above shutter 30 and light detector 43 is position below shutter 30 as shown in FIG. 15. The actual position of elements 42 and 43 is not critical, but they must be positioned to pass light from the LED 42 through a small hole 44 as shown in FIG. 15. As mechanical shutter 30 turns, once each revolution detector 43 detects light from LED 42 and sends a signal to CPU 16. Knowing the position of hole 44 and the position of the slots through mechanical shutter 30, for any rotational speed of mechanical shutter 30 CPU 16 then knows the position of the leading edges of shutter slots 27a,b and 28a,b and can trigger either laser 14a or 14b at the appropriate times.

FIG. 4 is a simple block diagram of the optical receiver 38 portion of the novel shearography system. A more detailed presentation of optical receiver 38 is given hereinafter with reference to FIG. 14. Responsive to each of the laser pulses illuminating and reflected from the ground below moving platform 11 an image of the ground below moving platform 11 is input to receiver optics 18. As previously mentioned with reference to FIG. 3 there are ground images alternately created by the laser pulses from laser 14a and laser 14b. Both ground images impinge on a sub-aperture plate 31 that is shown in and described with reference to FIG. 5. Sub-aperture plate 31 in the aperture stop plane of the receiver optics 18 has two holes 32a and 32b through it which are alternately blocked by a rotating mechanical shutter 30 which is shown in and described with reference to FIGS. 8-10. The holes have identical shapes and are separated by a distance ΔRstop and aligned with the direction of motion of the shearography platform. The apparent separation of the sub-aperture holes at the entrance pupil plane of the receiver optics is denoted as ΔR. Mechanical rotating aperture 30 permits the reflected light from the first laser 14a to pass only through the leading holes 32b in sub-aperture plate 31, and subsequently permits the reflected light from the second laser pulse 14b to pass only through the trailing hole 32a in sub-aperture plate 31. The reason for doing this is given further in this Detailed Description.

The light from each laser pulse that passes through sub-aperture plate 31 and rotating shutter 30 are sequentially input to a Michelson interferometer 39 and split to produce two laterally shifted images of the same surface on the ground which are superposed on, and recorded by the camera 40. The lateral shift distance is known as shear distance. The intensity distributions of the superposed, sheared images from each of the two laser pulses have a speckled appearance due to the interference of the highly coherent laser light which is reflected from the rough ground surfaces.

The images output from the Michelson interferometer 39, which are known as specklegrams, are captured by a CMOS camera 40 and are stored in a memory 41. Pairs of sequential specklegrams from laser 14a and 14b are spatially registered to one another and then further processed using methods known in the shearography art. The resulting images known as shearograms are shown on display 37. The anomalies 13 in the ground below moving platform 11 are clearly shown as moving platform 11 passes over them.

FIG. 5 shows a sub-aperture plate 31. Sub-aperture plate 31 has two identically shaped elongated holes 32a and 32b there through that are spaced a distance ΔRstop apart and aligned in the direction of motion of the platform as shown. As briefly described with reference to FIG. 4 the two holes through sub-aperture 31 are alternately blocked by the rotating mechanical shutter 30 which is shown in and described with reference to FIGS. 8-10.

FIG. 6 shows sub-aperture plate 31 with its upper hole 32b darkened. FIG. 6 also shows the direction of motion of the shearography system including sub-aperture plate 31. Hole 32b is darkened because rotating shutter 30 is initially blocking this hole, but allows light from a pulse of the first laser 14a that is reflected from the ground to pass through hole 32a. See FIG. 9.

FIG. 7 shows sub-aperture 31 plate with its lower hole 32a darkened. FIG. 7 also shows the direction of motion of the shearography system including sub-aperture 31. Hole 32a is darkened because the rotating shutter 30 is now blocking this hole at a time t=Δt, but allows light from a pulse of the second laser 14b that is reflected from the ground to pass through hole 32b. See FIG. 10.

FIG. 8 shows rotating shutter 30 that rotates in a clockwise manner and the direction of flight of a shearography system in which shutter 30 is mounted. In the present embodiment rotating shutter 30 has a diameter of 6.25 inches and typically rotates at a speed of 2600 RPM. However, this rotational speed may be changed, depending upon the air speed of moving platform 11 and the timing between pulses generated by lasers 14a and 14b under control of CPU 16.

Figure 9:
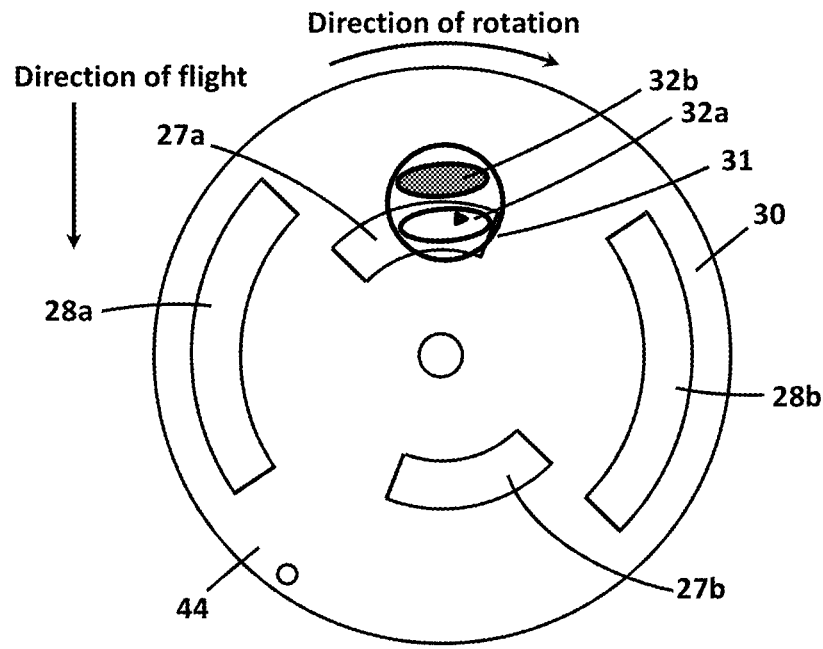
FIG. 9 shows an overlap of the sub-aperture element and the mechanical shutter with a first shutter slot being in alignment with a first hole through the sub-aperture to permit passage of a first image created by a pulse from the first laser.

FIG. 9 shows a sub-aperture plate 31 positioned over the top of a rotating shutter 30 with its first slot 27a directly under sub-aperture hole 32a. With this alignment of a hole and a slot, light from the first laser pulse enters the receiver optics only though the sub-aperture hole 32b. At this time the rotating shutter blocks any light impinging on hole 32b so it is shown darkened. Timing mark hole 44 has already been mentioned and is shown in and is described with reference to FIG. 15 so is not described here.

Figure 10:
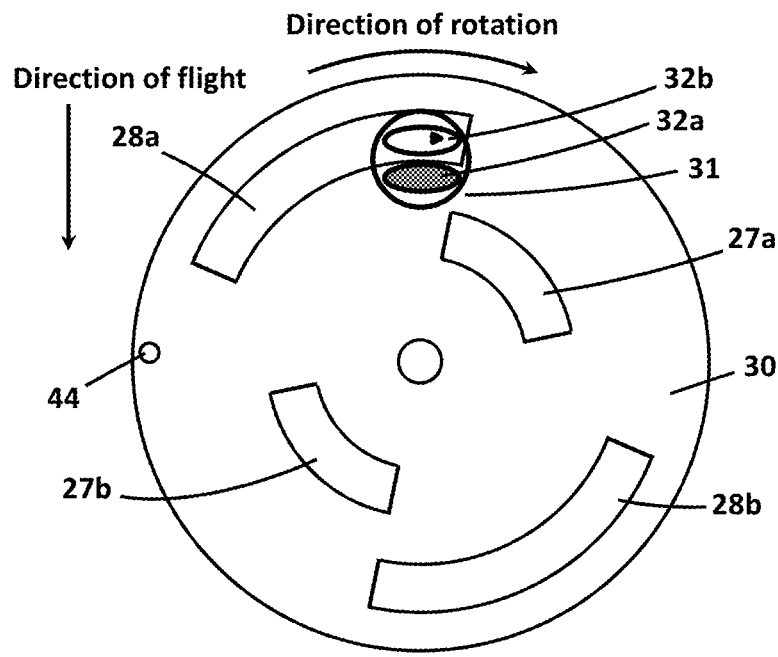
FIG. 10 shows an overlap of the sub-aperture element and the mechanical shutter with a second shutter slot being in alignment with a second hole through the sub-aperture to permit passage of a second image created by a pulse from the second laser.

In FIG. 10 rotating shutter 30 has rotated an angular amount that takes sub-aperture hole 32a out of alignment with first shutter slot 27a and, at the same time, sub-aperture hole 32b is now in alignment with second shutter slot 28a. Second shutter slot 28a is now directly under sub-aperture hole 32b. With this alignment of a hole and a slot light from the second laser pulse enters the receiver optics only through the sub-aperture hole 32b. Since the sub-aperture holes have the same shape and appear to be separated by a distance ΔR in the entrance pupil of the receiver, they will appear to be at the same location in space relative to the ground provided that the shearography platform moves the same distance ΔR in the time between the two laser pulses. A key condition to preserve the correlation between speckles in the specklegram images from the first and second laser pulses is to position the receiver optics entrance pupil at the same location relative to the ground for both laser pulses. The time delay between the laser pulses is adjusted by the CPU controller 16 so that the product of the measured platform velocity and the time delay is equal to ΔR.

As rotating shutter 30 rotates further the process described in the previous two paragraphs is repeated but utilizing rotating shutter slots 27b and 28b. This process is repeated twice for each revolution of shutter 30.

Figure 11:
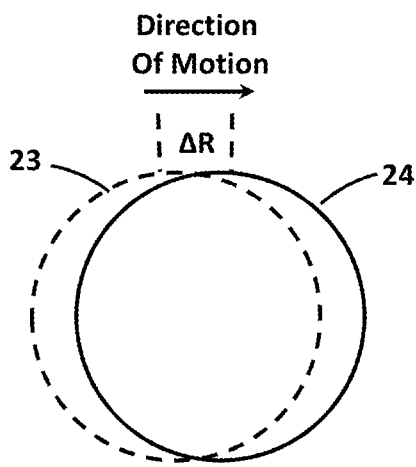
FIG. 11 shows two circles representing the first and second images captured by the optical receiver and showing the degree of overlap of the two images resulting from the very short time Δt between generating two laser pulses used to capture the two images.

FIG. 11 shows two overlapping circles 23 and 24. Circle 23 represents the first image of the ground below moving platform 11 obtained responsive to a pulse from first laser 14a. Similarly, circle 24 represents the second image of the ground below moving platform 11 obtained responsive to a pulse from second laser 14b. Due to the speed of moving platform 11 over the ground there is a distance ΔR between these two images. The spacing of the two images in FIG. 11 is slightly exaggerated to more easily see that the spacing exists. However, the spacing is actually very small because the time spacing between the first laser pulse and the second laser pulse is only a few milliseconds apart and the moving platform is typically moving at a speed between 40 mph and 100 mph. With moving platform 11 moving at the velocity of 40 mph, this is 704 inches per second, and assume that the timing between the first and second laser pulses is t=0.003 seconds. Using the equation d=v·t to find ΔR, we have ΔR=704 in/sec·0.003 seconds. ΔR=1.112 inches traveled between the first and second laser pulses. While small relative to the size of the aircraft, this distance is many orders of magnitude greater than the wavelength of light, and well beyond the useable range that can be accommodated by prior-art shearography systems.

Figure 12:
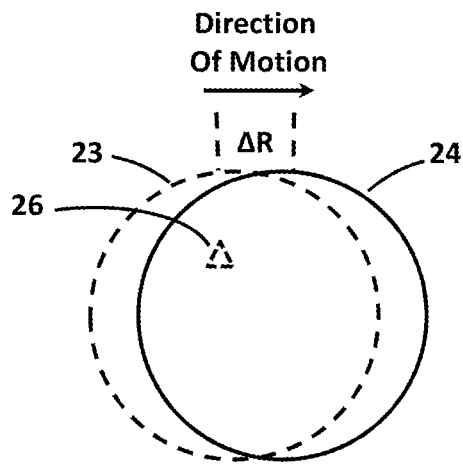
FIG. 12 shows two closely overlapping circles representing the first and second images captured by the optical receiver, showing the same anomaly captured in both images.

FIG. 12 also shows the two overlapping images 23 and 24 representing a first image received in response to a first laser pulse and a second image received in response to a second laser pulse that trails the first laser pulse by about 3 milliseconds. Item 26 designates an anomaly in the ground as illustrated by item 13 in FIG. 1. Once acquired, the two specklegram images 23 and 24 must be registered so that the anomaly appears at the same position in both images. This may be performed by finding the image offset that maximizes correlation of the two specklegrams or by identifying and aligning other features that may be present in both images.

Figure 13:
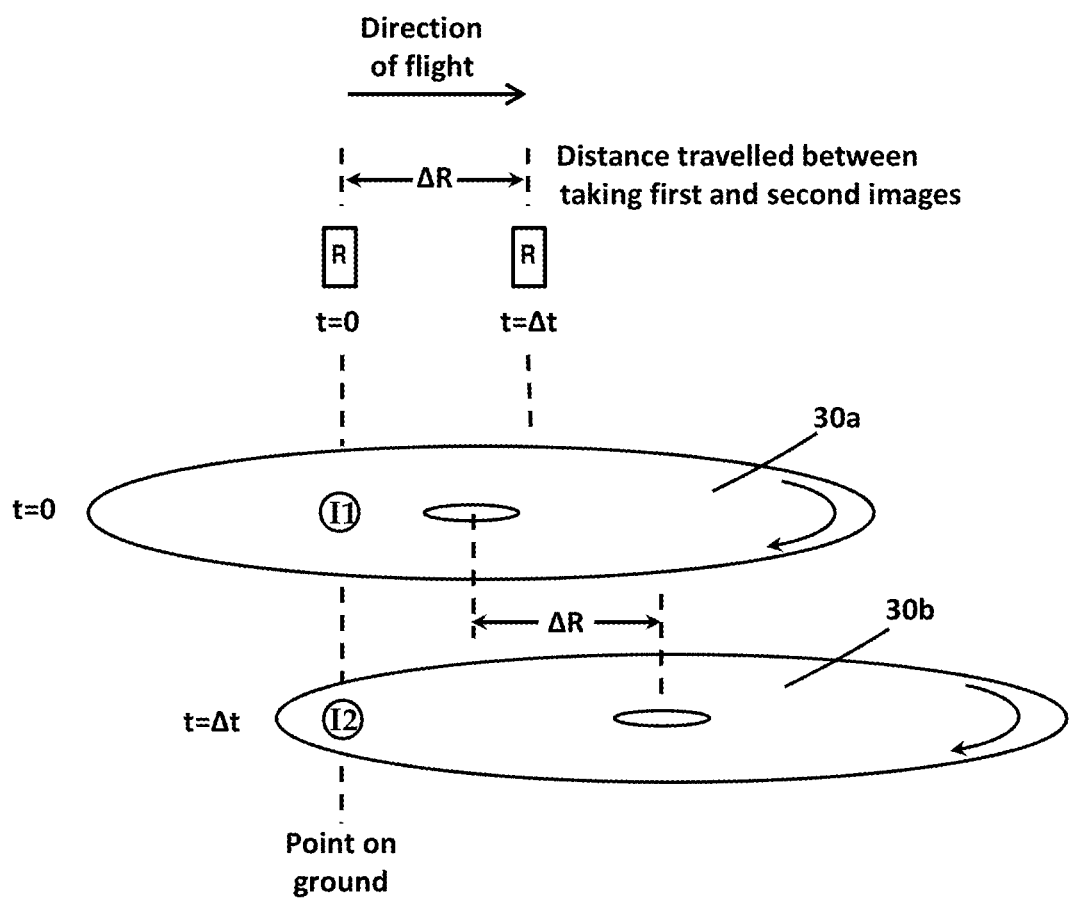
FIG. 13 is a diagram that illustrates how two images are taken from the same point in space with the moving shearography equipment.

FIG. 13 is a diagram that illustrates how two images are taken from the same point in space with the moving shearography equipment of the present invention. In this description the single optical receiver is preferred to as 15a at t=0 and as 15b at t=Δt. Thus, for a given airspeed of moving platform 11 the platform travels the distance ΔR as may be seen. Shown are two representations of rotating shutter 30, one representation at t=0 and that rotating shutter is referred to as 30a, and the other representation is at time t=Δt and that rotating shutter is referred to as 30b. The shearography equipment on which the rotating shutter is mounted is moving to the right in FIG. 13 and the shutter is rotating clockwise. As the shearography equipment is moving to the right, at t=0 shutter 30a is in a position where an image from the ground passes through an aligned sub-aperture hole and a slot through shutter 30a (at I1). As the moving platform moves further to the right at time t=Δt rotating shutter is shown as 30b and it has traveled to the right a distance of ΔR as shown. At this time a different sub-aperture hole and a different slot through shutter 30b are aligned and the same ground image travels through them at 12. Because 12 is to the left of I1, both the first image and the second image are being taken at the same spot in space as shown. The distance ΔR is relatively small, in the order of a couple of inches, because the time between capturing the first image and the second image with laser pulses from the two lasers is Δt and is in the order of 3 milliseconds and the speed of the moving platform is less than 100 miles per hour.

Figure 14:
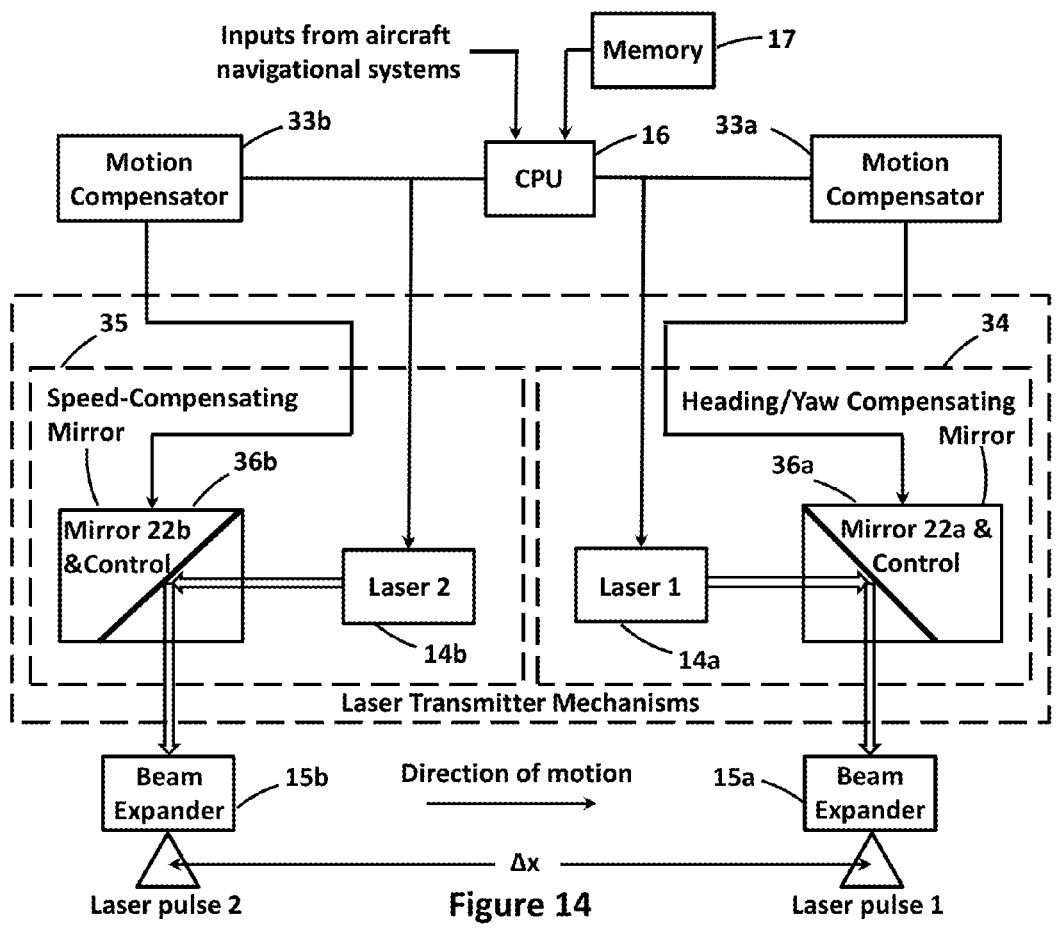
FIG. 14 is a more detailed block diagram of the laser transmitter of the present invention.
Figure 15:
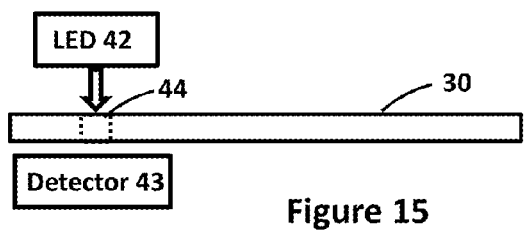
FIG. 15 is a side view of the rotating shutter showing a light means for determining the angular position of the rotor.

FIG. 14 is a detailed block diagram showing more details of dual laser transmitters 14a (L1) and 14b (L2) of the moving shearography system of the present invention. The system utilizes two spaced lasers 14a and 14b that generate Laser Beams 1 & 2 that are respectively reflected off mirrors 22A and 22B and directed nominally parallel to each other toward the ground. Laser Beams 1 and 2 each have a wavelength of 532 nanometers, and are highly coherent with each other due to common seeding from a common, stable, constant wave laser. Two lasers are utilized due to the very short time between two successive laser pulses required to create the interference patterns for the shearography. As previously, described the time difference is only a few milliseconds. Each laser pulse from laser 14a reflects off mirror 22a and then passes through a beam expander 15a. The expanding beam is directed toward the ground as Laser Pulse 1. Each laser pulse from laser 14b reflects off mirror 22b and then passes through a beam expander 15b. The expanded beam is directed toward the ground as Laser Pulse 2. The two expanded laser pulses each have a diameter of approximately 2 meters on the surface of the ground below aircraft 11. Beam expanders are well known in the art and examples may be seen in U.S. Pat. Nos. 4,205,902 and 6,157,756.

The optical axes of the diverging beams from lasers 14a (L1) and 14b [L2] are spaced apart in the direction of motion by ΔR, the apparent spacing of the receiver sub-aperture holes as shown in FIGS. 2 and 5. As may be seen in FIG. 15, the spacing between the fold mirrors 22a and 22b is adjusted to be equal ΔR. The actual lasers 14a and 14b that generate the laser beams are fixed relative to the platform. Using velocity information from the navigation instrumentation, CPU 16 controls the delay between the firing of laser 14a (L1) and laser 14b so that the shearography platform moves a distance ΔR, the apparent separation between receiver sub-apertures 32a and 32b, during the delay. The laser outputs are typically a few milliseconds apart. Responsive to the two sequential laser pulses both a first image and a second image are captured by optical receiver 15, as described elsewhere herein, in a manner that the receiver aperture appears to be located at the same point in space above anomaly 13 for both images.

There is a CPU 16 that operates under control of a program stored in memory 17 that runs the novel moving shearography system. For setup, CPU 16 uses measured velocity of the aircraft and the known distance between the receiver sub-aperture holes ΔR and the measured angular position of the rotating shutter in the receiver to calculate when lasers 14a and 14b fire. In addition, CPU 16 controls motion compensators 33a and 33b which, in turn, control mirror position compensating circuits 36a&b. Mirrors 22a and 22b are mounted on orthogonal translation stages such that their position can be easily and quickly changed in responsive to calculations made by CPU 16.

During flight the ground speed and yaw of aircraft 11 may change due to changes in wind speed and direction. CPU 16 has inputs from navigational systems of aircraft 11 that include, but are not limited to, highly accurate GPS readings that may be used to determine the ground speed and heading of aircraft 11 on a second by second basis. As the ground speed changes time delay between laser pulses will change accordingly so that the total platform motion between laser pulses is equal to ΔR. CPU 16 makes calculations that readjust this time delay.

In addition, due to various side wind conditions an aircraft experiences during flight it will experience yaw that changes the heading of the aircraft and must be corrected. These conditions change the direction that aircraft 11 actually points as it flies (yaw). Using the same highly accurate GPS readings that are described in the previous paragraph CPU 16 performs calculations that control motion compensator 33a to position mirror 22a, mounted on a stage parallel to the aircraft axis, to maintain constant separation ΔR between the laser beams.

FIG. 15 shows a side view of a rotating shutter 30 having a hole 44 there through near the edge of the shutter. An LED 42 is mounted on one side of shutter 30 and a light detector 43 is mounted on the other side of shutter 30. These components generate a timing signal which is used by CPU 16 to synchronize the rotation of rotating shutter 30 with the rest of the shearography system. Once each revolution of shutter 30 hole 44 comes between LED 42 and light detector 43 which detects the light and generates a signal to CPU 16. CPU 16 knows where the four elongated, arcuate slots 27a, 27b 28a and 28b are with respect to hole 44 so knows when to control lasers 14a and 14b to generate pulses that are used to create images of the ground below the moving platform 11 for the shearography equipment.

While what has been described herein is a preferred embodiment of the invention those skilled in the art will understand that numerous changes may be made without departing from the spirit and scope of the invention. For example, moving shearography may be performed in a manufacturing setting wherein a sheet of material, such as sheet steel, passes underneath the novel moving shearography equipment and anomalies in the sheet steel are seen and analyzed for quality control purposes. It is also possible that the novel moving shearography may be performed when both the shearography equipment and something beneath it are both moving but in different directions. For another example, while a mechanical rotating shutter and a sub-aperture are disclosed herein for capturing successive images at the same point in space, other means and methods may be utilized to accomplish the same purpose.

The invention claimed is:

1. Apparatus for performing shearography of a surface from a platform that is moving above and over the surface, the apparatus comprising:

(a) first laser means for generating a first of a pair of pulses of coherent light that reflects off the surface to create a first image, the first laser means generating its first laser pulse from a first point in space; and (b) second laser means for generating a second of the pair of pulses of coherent light that reflects off the surface to create a second image, the second laser means being spaced a known distance from the first laser means, the second laser means generating its second pulse a known time after the first laser means generates its first pulse, and after the known time the second laser means is at the first point in space where it generates the second laser pulse;

(c) optics for receiving both the first image and the second image reflected from the surface;

(d) image passing means associated with the optics, wherein the image passing means passes the first image when the first laser means is at the first point in space, and after the known time the image passing means passes the second image when the second laser means is at the first point in space;

(e) means for dividing the first image into two copies laterally displaced from each other on the same image plane, and for dividing the second image into two copies laterally displaced from each other on the same image plane;

(f) means for capturing the two copies of the first image to create a first specklegram and subsequently capturing the two copies of the second image to create a second specklegram;

(g) means for storing both the first specklegram and the second specklegram; and (h) means for combining the first specklegram and the second specklegram to create a sheargram image showing changes in the surface.

2. The shearography apparatus of claim 1 wherein the image passing means comprises an aperture means having a first aperture and a second aperture there through, and further comprising a shutter means having at least a first slot and a second slot there through, the aperture means being positioned adjacent to the shutter means and the first slot being aligned with the first aperture to pass the first image to the optical receiver, and the second slot being aligned with the second aperture after the known time to pass the second image.

3. The shearography apparatus of claim 2 wherein the first slot is spaced from the second slot so that as the shearography apparatus moves over the surface, when the first slot is aligned with the first aperture they are both at the first position and when the second slot is aligned with the second aperture they are both at the second position.

4. The shearography apparatus of claim 3 wherein the spacing between the first laser means and the second laser means is adjusted to match the speed of the platform and the known time between the first laser pulse and the second laser pulse.

5. The shearography apparatus of claim 4 further comprising beam expander means for expanding the first laser pulse and the second laser pulse into a wide area before they impinge on the surface.

6. The shearography apparatus of claim 4 wherein the first laser has a first mirror associated therewith that reflects the first laser pulse toward the surface below the moving platform and the first mirror is moved to adjust the spacing between the laser beam from the first laser and the laser beam from the second laser.

7. The shearography apparatus of claim 6 wherein the second laser has a second mirror that reflects the second laser pulse toward the surface below the platform and the second mirror is moved to compensate for heading and yaw of the platform on which the shearography apparatus is located.

8. The shearography apparatus of claim 1 wherein the known time between the first image and the second image is so short the two images mostly overlap each other so that any anomaly on the surface will appear in both images.

9. Apparatus for performing shearography of a surface from a platform that is moving with respect to the surface, the apparatus comprising:

(a) first laser means for generating a first pulse of coherent light that reflects off the surface to create a first image, the first laser means generating its first pulse of coherent light from a first point in space; and (b) second laser means for generating a second pulse of coherent light that reflects off the surface to create a second image, the second laser means being spaced a known distance from the first laser means, the second laser means generating its second pulse a known time after the first laser means generates its first pulse, and after the known time the second laser means is at the same first point in space;

(c) beam expander means for expanding the first laser pulse and the second laser pulse into a wide area before they impinge on the surface below the platform;

(d) optics for receiving and passing both the first image and the second image reflected from the surface; and (e) an image selection means associated with the optics, the image selection means having a first selection means and a second selection means and, wherein the image selection means passes the first image when the first selection means is at the first point in space, and after the known time the second selection means is at the same first point in space and passes the second image;

(f) means for dividing the first image into two copies laterally displaced from each other on the same image plane, and for dividing the second image into two copies laterally displaced from each other on the same image plane;

(g) means for combining the two copies of the first image to create a first specklegram and subsequently combining the two copies of the second image to create a second specklegram; and (h) means for combining the first specklegram and the second specklegram to create a single shearogram image showing changes in the surface as a set of visible shearogram fringes.

10. The shearography apparatus of claim 9 wherein the spacing between the first laser means and the second laser means is adjusted to match the speed of the moving platform and the known time between the first laser pulse and the second laser pulse.

11. The shearography apparatus of claim 10 wherein the first laser has a first mirror that reflects the first laser pulse toward the surface below the platform and the first mirror is moved to adjust the spacing between the first laser and the second laser.

12. The shearography apparatus of claim 11 wherein the second laser has a second mirror that reflects the second laser pulse toward the surface below the platform and the second mirror is moved to compensate for heading and yaw of the platform on which the shearography apparatus is located.

13. The shearography apparatus of claim 12 further comprising beam expander means for expanding the first laser pulse and the second laser pulse into a wide area before they impinge on the surface below the platform.

14. The shearography apparatus of claim 13 wherein the known time between the first image and the second image is so short the two images mostly overlap each other so that any anomaly on the surface will appear in both images.

15. The shearography apparatus of claim 9 wherein the first laser has a first mirror that reflects the first laser pulse toward the surface below the platform and the first mirror is moved to adjust the spacing between the pulse from the first laser means and the pulse from the second laser means.

16. The shearography apparatus of claim 15 wherein the second laser has a second mirror that reflects the second laser pulse toward the surface below the platform and the second mirror is moved to compensate for heading and yaw of the platform on which the shearography apparatus is located.

17. The shearography apparatus of claim 16 wherein the known time between the first image and the second image is so short the two images mostly overlap each other so that any anomaly on the surface will appear in both images.

18. The shearography apparatus of claim 17 wherein the spacing between the first laser means and the second laser means is adjusted to match the speed of the moving platform and the known time between the first laser pulse and the second laser pulse so that the second laser pulse is generated at the same first point in space where the first laser pulse was generated.

* * * * *